(12) United States Patent
Weaver

(10) Patent No.: US 7,421,476 B2
(45) Date of Patent: Sep. 2, 2008

(54) METHOD FOR CONVERTING INTERNET MESSAGES FOR PUBLISHING

(76) Inventor: Eric R. Weaver, 2008 E. Patterson St., Tampa, FL (US) 33610

(*) Notice: Subject to any disclaimer, the term of this patent is extended or adjusted under 35 U.S.C. 154(b) by 1051 days.

(21) Appl. No.: 10/695,975

(22) Filed: Oct. 29, 2003

(65) Prior Publication Data

US 2004/0093558 A1  May 13, 2004

Related U.S. Application Data

(60) Provisional application No. 60/422,066, filed on Oct. 29, 2002.

(51) Int. Cl.
*G06F 15/16* (2006.01)

(52) U.S. Cl. ............... 709/206; 709/204; 709/205; 709/227; 707/2; 707/3; 707/7

(58) Field of Classification Search ............ 709/204, 709/205, 206, 227; 707/2, 3, 7
See application file for complete search history.

(56) References Cited

U.S. PATENT DOCUMENTS

| 4,429,385 | A | 1/1984 | Cichelli et al. |
| 5,017,917 | A | 5/1991 | Fisher et al. |
| 5,283,856 | A | 2/1994 | Gross et al. |
| 5,418,943 | A | 5/1995 | Borgida et al. |
| 5,819,269 | A * | 10/1998 | Uomini .......... 707/7 |
| 6,154,764 | A | 11/2000 | Nitta et al. |
| 6,209,100 | B1 * | 3/2001 | Robertson et al. ......... 726/2 |
| 6,236,994 | B1 | 5/2001 | Swartz et al. |
| 6,363,427 | B1 * | 3/2002 | Teibel et al. ............ 709/227 |
| 6,778,982 | B1 * | 8/2004 | Knight et al. ............ 707/3 |
| 6,823,363 | B1 * | 11/2004 | Noveck et al. .......... 709/204 |
| 6,968,362 | B2 * | 11/2005 | Koch et al. ............. 709/206 |
| 2002/0052920 | A1 * | 5/2002 | Umeki et al. ........... 709/205 |
| 2002/0065827 | A1 * | 5/2002 | Christie et al. ........... 707/10 |

* cited by examiner

*Primary Examiner*—Jinsong Hu
(74) *Attorney, Agent, or Firm*—Larson & Larson; James E. Larson; Frank Liebenow

(57) ABSTRACT

A method of converting internet messages is provided. A first message database is provided on a first computer which is coupled to the Internet and accessible by users thereof. Internet messages from an Internet discussion forum such as a standard e-mail users group, message forum or newsgroup database can be transferred from the first database to a more specialized forum in a second database on a second computer, also coupled to the Internet, utilizing a protocol provided on the second computer. The messages can be edited and revised for further discussion and eventual publishing as a book, web page or other known publishing format.

13 Claims, 2 Drawing Sheets

METHOD FOR CONVERTING INTERNET MESSAGES FOR PUBLISHING

PRIOR APPLICATIONS

This application bases priority on provisional application 60/422,066 filed on Oct. 29, 2002.

BACKGROUND OF THE INVENTION

1. Field of the Invention

This invention relates to the transferring of Internet messages from a linear posting forum database into a specialized forum to be edited and revised for subsequent publishing.

2. Background of the Prior Art

The posting of information on the Internet (a global information computer network) for others to read and comment upon is well known in the prior art. The posting of information is typically effected through an e-mail user group, a message forum or a newsgroups. The information is posted in a linear format whereby a first message is posted and others may then comment or discuss the original posting (first message). This type of posting format does not permit message editing or other types of message manipulation of the originally posted message, or any messages posted thereafter in response thereto, but instead requires a new "thread" to be posted with the updated information or data. Accordingly, a long discussed topic can be filled with inaccurate data throughout the postings. This makes it difficult for someone to sort through all of the postings and find the most relevant and accurate information. Various U.S. Patents have issued dealing with the posting of information on the Internet.

U.S. Pat. No. 6,154,764 discloses an electronic conferencing system where users may post and read messages allowing for the deletion of messages. A major deficiency of this prior art reference is the inability to transfer selected messages from one conference to another.

U.S. Pat. No. 4,429,385 discloses a digital data transmission system where each message is preceded by a headnote, structured so that upon reception, the receiver can select messages based upon a combination of hierarchical and relational views of the message data, without any interaction whatsoever with the broadcast system. This prior art reference provides no additional tools for editing and updating the messages selected.

U.S. Pat. No. 5,017,917 discloses a mass electronic mail where subscribers in each community have common rights of access to one or more communication services permitting the sending and receiving of mail messages. However, the rights are generally different from those of subscribers in other communities. This invention provides no additional tools for editing and updating messages.

U.S. Pat. No. 5,819,269 is an apparatus and method for dynamically sub-grouping messages in a news network provided to assist posters and readers in the news network. This prior art features reference categories and subcategories which may be filtered and sorted by the user. However, this invention provides no additional tools for editing and updating of messages posted.

U.S. Pat. No. 5,283,856 discloses a flexible, event driven and conditional rule-based mail messaging system which can be transparently implemented for use in electronic mail applications. However, this provides no specific methods for duplicating messages posted into a new forum.

U.S. Pat. No. 6,236,994 is a method and apparatus for integrating the operation of various independent software applications directed to the management of information within an enterprise. However, such applications provide no uniform tool for importing messages from one forum to another location.

U.S. Pat. No. 5,418,943 discloses an apparatus and method for integrating a knowledge base management system with a database system. This invention provides no method for editing the data within the database.

The aforementioned prior art systems do not provide a method to easily edit messages in news groups and message forums in preparation for publishing. What is needed is an efficient method for importing messages into a database that will allow for editing and revising of the messages. This would allow the messages to be easily arranged for publishing in a web page, book form, or other known publishing format.

SUMMARY OF THE INVENTION

The method and tools of this invention utilize a standard Internet e-mail users group, message forum or newsgroup. The individual messages within the forum are typically sorted and threaded by subjects. The novel system of the present invention permits a client to select a newsgroup thread or provide other specific criteria for the selection of messages within a discussion group. The selected messages are then copied into a new specialized forum whereby users may be invited to continue an ongoing discussion of the specific selected criteria. This novel specialized forum provides editing and publishing tools for the new discussion group.

A software based tool is provided for editing and updating messages transferred into the new forum by the moderator. The new specialized messaging forum is designed for the publishing of a book, website or other new document. Clients debating a specific topic on the forum provide and introduce new, critical or important information that the moderator prepares for publishing. The specialized forum provides tools for editing, and updating messages, in addition to the typical functions found in forums for specific posting rules, user access and message responses.

A moderator may add or ban clients, advertise for new clients, pull in additional threads from other newsgroups or delete existing messages. Additional tools enhance interaction between clients and publishers.

In the preferred embodiment, an Internet user within an existing messaging system discovers a new technology or pioneering conception through an ongoing debate and discussion with peers and others skilled within the specific art of discussion. Such user may then sign up for new discovery and transfer all of the previous messages, or a selected number of messages, of the debate into a new forum where he can act as a new moderator. Thereafter, he may then invite his peers to continue this debate, edit and update messages and copy and revise segments for subsequent publishing in one of many known formats including, but not limited to, a new web page or a book.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Figure 1:
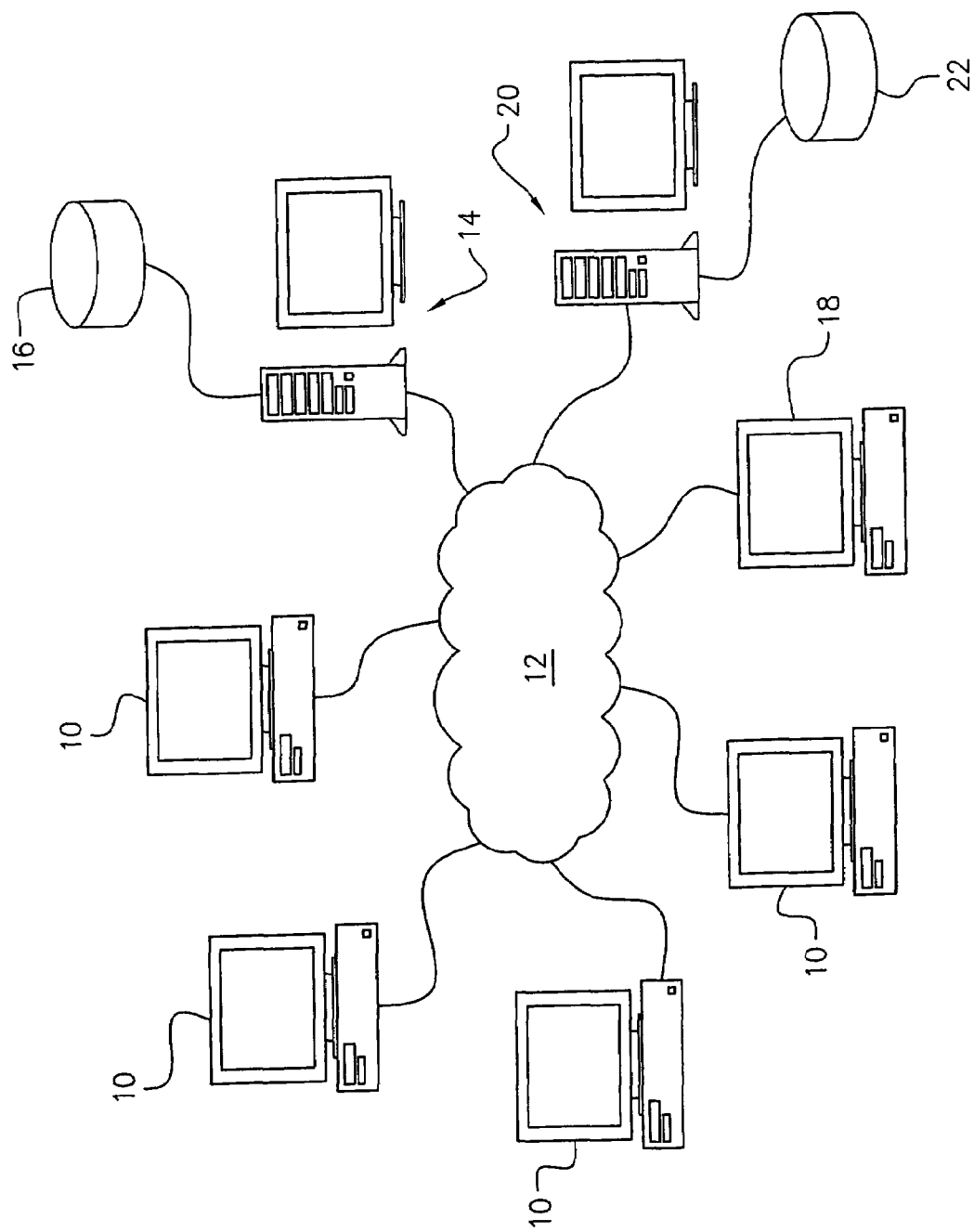
FIG. 1 shows the configuration of an Internet e-mail users group, message forum or newsgroup database and a database and computer for a specialized forum for the method of the present invention.

Throughout the following detailed description, the same reference numerals refer to the same elements in all figures.

Referring to FIG. 1, a client 10 with existing access to the Internet 12 participates in a standard Internet e-mail users group, message forum or newsgroup. Such standard Internet e-mail users group, message forum or newsgroup is established on a first message database 16 within a first computer 14 coupled to the Internet 12. When a client 10 locates a thread or message within a discussion group in a first message database 16, the method of the present invention allows the client 10 to transfer the messages from the first message database 16 to a second message database 22 located on a second computer 20 also coupled to the Internet 12. The client 10 will then use special operation software loaded on the second computer 20 to prepare documents for a publisher 18.

Figure 2:
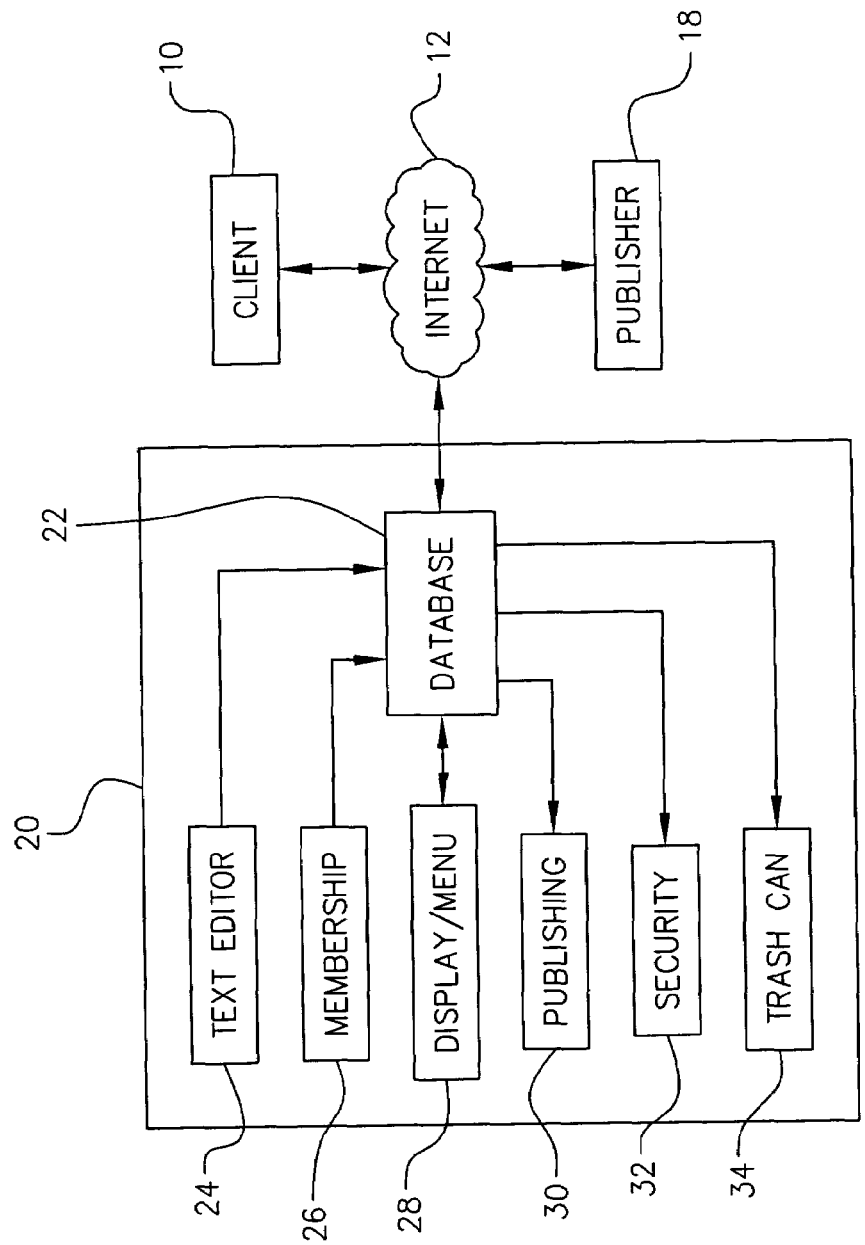
FIG. 2 shows a flow diagram of the components of the method of the present and how it interacts with a user, the Internet and a publisher.

Referring to FIG. 2, each client 10 subscribing to the method may utilize the special operation software located on the second computer 20 to modify a news group or forum on the second message database 22. Such operations include editing tools and methods 24 (i.e., text editor), membership rules and criteria 26, graphical display and menus 28, publishing promotional tools 30, security mechanisms 32 and a trash can 34 to retain deleted items for future retrieval.

The special operation software of second computer 20 provides for easy entry and manipulation of the second message database 22 for presenting to a publisher 18 or re-posting on the Internet 12. Any client 10 can subscribe to use the special operation software on the second computer 20 to create a new news group or forum on a second message database 22 for use on the Internet 12 and future publishing 18 without interfering with any other client utilizing the software.

An alternative configuration would be provided by a publisher 18 or other computer technology provider where all the tools of second computer 20 and second message database 22 are directly available to clients 10 across the Internet 12 though a single mode. Such tools could therefore be added to existing systems by operators of any standard Internet e-mail users group, message forum or newsgroup.

As stated above, the preferred embodiment employs a first and second computer, 14 and 20 respectively. However, nothing herein limits that use of only a single computer (i.e., first computer 14). Accordingly, first message database 16 and second message database 22 can both be located on first computer 14. Further, the special operation software can also be located on first computer with both databases. In these two configuration, second computer 20 is not needed. Other configurations can also be employed. For instance, both databases can be located on first computer 14 while the special operation software is located on second computer 20. Or, three computers can be employed, one each for the two databases and one for the special operation software.

Equivalent steps can be substituted for the ones set forth to perform the same method thereby achieving the same result in the same manner.

Having disclosed the invention, what is claimed for Letters Patent is:

1. A method for converting Internet messages for publishing, the steps of the method comprising:
   a) providing at least one computer coupled to the Internet;
   b) providing a first message database on the at least one computer;
   c) posting a message on the first message database for access by users of the Internet;
   d) permitting the users of the Internet to respond to the first message by posting subsequent messages to the first message database on the at least one computer;
   e) providing a second message database on the at least one computer;
   f) providing a protocol for interfacing the first and second databases;
   g) establishing a set of rules for the protocol which permits the users of the Internet to retrieve specific messages from the first database;
   h) importing the retrieved specific messages from the first database to the second database by utilizing the interfacing protocol;
   i) editing the retrieved messages in the second database in a predefined structure;
   j) outputting the predefined edited retrieved messages in a published format;
   k) establishing a hierarchy for the second database thereby permitting a single user to act as a moderator for controlling the steps of importing retrieved messages, editing retrieved messages and outputting the predefined edited retrieved messages; and
   l) permitting the moderator to give access to the steps of importing retrieved messages, editing retrieved messages and outputting the predefined edited retrieved messages to a user of the Internet at the discretion of the moderator.

2. The method of claim 1, wherein the first message database is an Internet discussion format selected from the group consisting of an email user group, a message forum and a newsgroup.

3. The method of claim 1, wherein the step of editing the retrieved messages in the second database permits adding and deleting data to the retrieved messages.

4. The method of claim 1, further comprising the step of establishing a membership for the second database for all users of the Internet, the membership controlled by the moderator.

5. The method of claim 4, wherein the membership permits users of the Internet having access to the second database to communicate with one another.

6. The method of claim 5, wherein membership communication permits the users to view and respond to all messages posted in the second database.

7. The method of claim 6, further comprising the step of permitting the moderator to block messages posted to the second database by the users of the Internet.

8. The method of claim 1, further comprising the step of providing a display menu accessible by the moderator for defining the rules of the protocol.

9. The method of claim 1, further comprising the step of providing a virtual trash can for retaining deleted data, the virtual trash can located on the at least one computer.

10. The method of claim 9, further comprising the step of retrieving deleted data located in the virtual trash can.

11. The method of claim 1, further comprising the steps of a) interfacing the second database with a publisher; and b) transferring the predefined edited retrieved messages to the publisher.

12. The method of claim 1, wherein the first database is located on a first computer and the second database is located on a second computer.

13. The method of claim 12, wherein the protocol for interfacing the first and second databases is located on the second computer.

* * * * *